United States Patent [19]
Howie, Jr.

[11] Patent Number: 5,845,365
[45] Date of Patent: Dec. 8, 1998

[54] METHOD FOR MANUFACTURING AN INDICATOR KNOB AND A KNOB

[75] Inventor: Robert K. Howie, Jr., Decatur, Ill.

[73] Assignee: The Grigoleit Company, Decatur, Ill.

[21] Appl. No.: 605,270

[22] Filed: Jan. 5, 1996

[51] Int. Cl.⁶ .................................................. E05B 17/10
[52] U.S. Cl. ...................... 16/121; 16/DIG. 19; 116/309; 240/2.13
[58] Field of Search .............................. 16/121, DIG. 19, 16/DIG. 30; 116/309, DIG. 30, 318, 328

[56] References Cited

U.S. PATENT DOCUMENTS

| | | |
|---|---|---|
| 2,285,963 | 6/1942 | Gits et al. . |
| 2,831,453 | 4/1958 | Hardesty . |
| 3,543,329 | 12/1970 | Gulette et al. . |
| 3,619,594 | 11/1971 | Morez ..................................... 240/2.13 |
| 4,000,539 | 1/1977 | Neyer ........................................ 16/121 |
| 4,295,246 | 10/1981 | Howie ....................................... 16/121 |
| 4,536,116 | 8/1985 | Murray ..................................... 16/121 |
| 4,893,392 | 1/1990 | Stricker et al. . |
| 4,996,784 | 3/1991 | Hsu .......................................... 40/799 |
| 5,050,269 | 9/1991 | Engstrom et al. . |
| 5,197,161 | 3/1993 | Howie ....................................... 16/121 |
| 5,450,653 | 9/1995 | Howie ....................................... 16/121 |
| 5,469,758 | 11/1995 | Howie ............................... 16/DIG. 19 |

Primary Examiner—Daniel W. Howell
Assistant Examiner—Mark Williams
Attorney, Agent, or Firm—Dorn, McEachran, Jambor & Keating

[57] ABSTRACT

A method of making a composite plastic knob including the steps of forming a plastic core having a front wall of a generally uniform thickness with an integral discernible window portion formed in a fin projecting outwardly of the front wall and with the window having a thickness less than the generally uniform thickness of the front wall; positioning an anvil in the core in supporting engagement with the window portion of the fin and injection molding an outer covering of an opaque plastic of a contrasting color over the front wall of the core except for the window portion of the fin thereof. The knob includes a plastic core having a front wall of generally uniform thickness and an integral portion of a window formed in a fin projecting outwardly of the front wall. The window is thinner than the front wall of the core. An anvil is positioned in the core in engagement with the window portion of the front wall and an outer covering of an opaque plastic overlies the front wall of the core except for the window to allow the window to function as an indicator. The anvil may be of metal and formed as part of the tooling or it may be formed of a light transmitting material which is permanently fastened into the core of the knob. The permanently fastened anvil may be equipped with radially extending hooks.

21 Claims, 2 Drawing Sheets

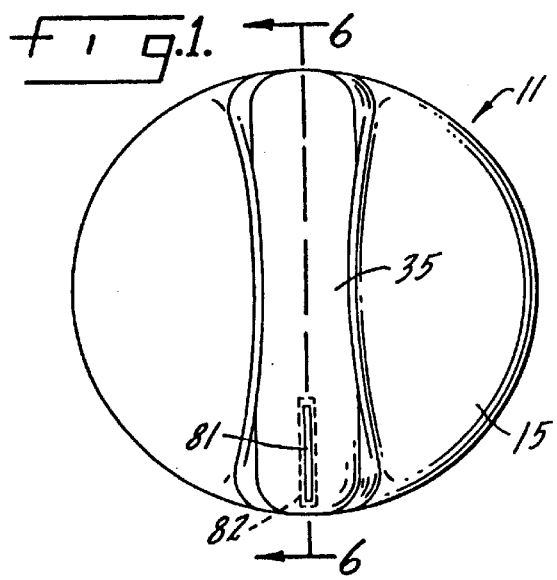
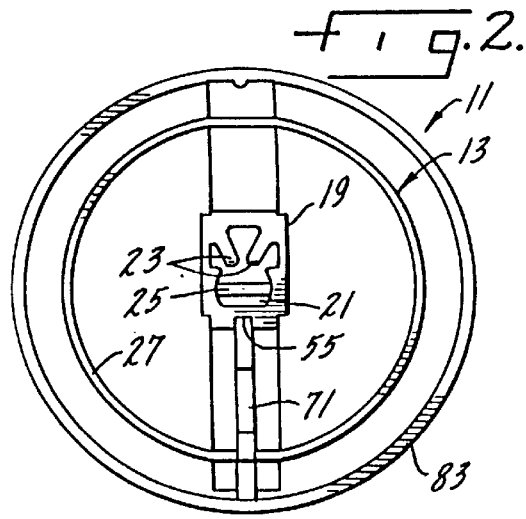
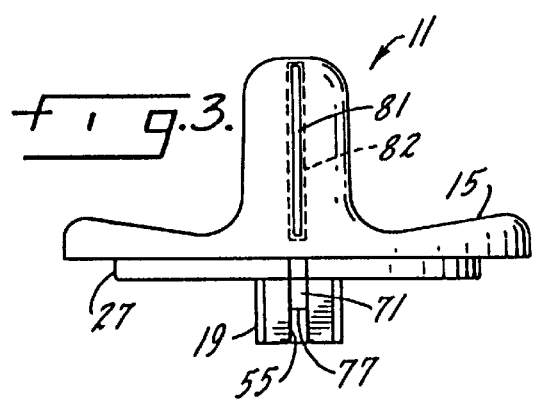
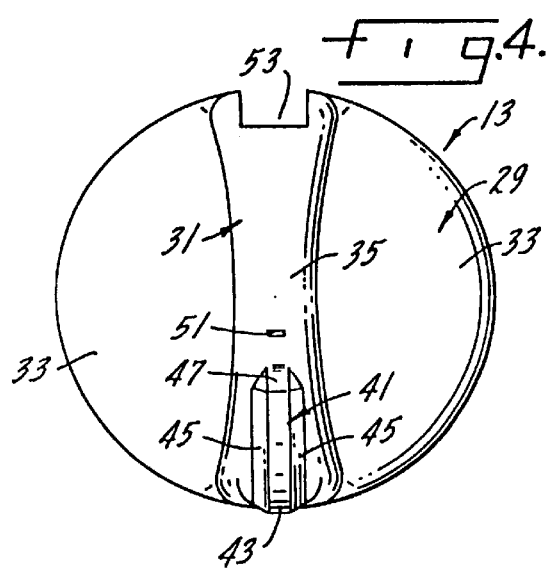
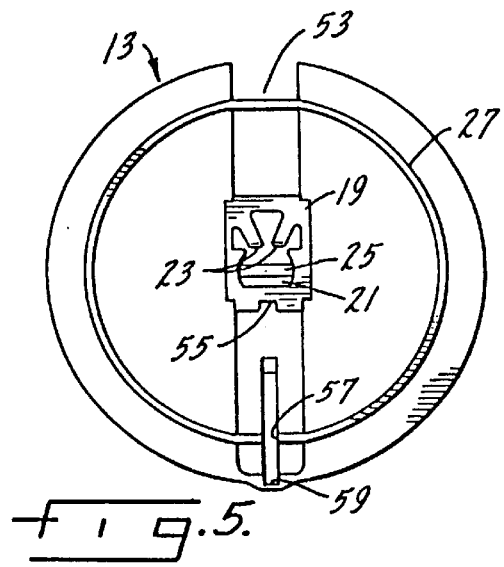
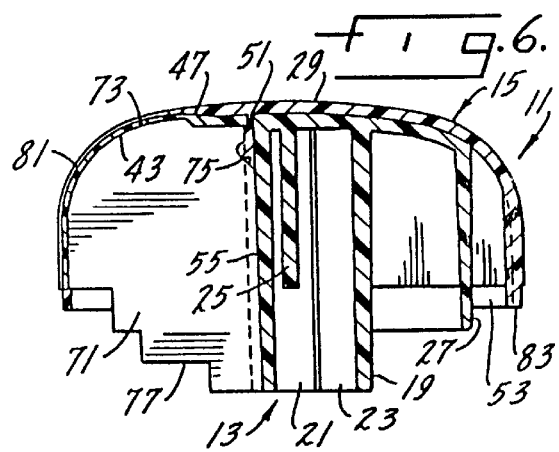

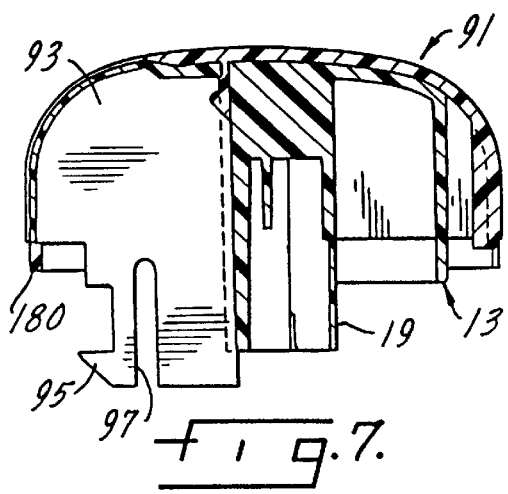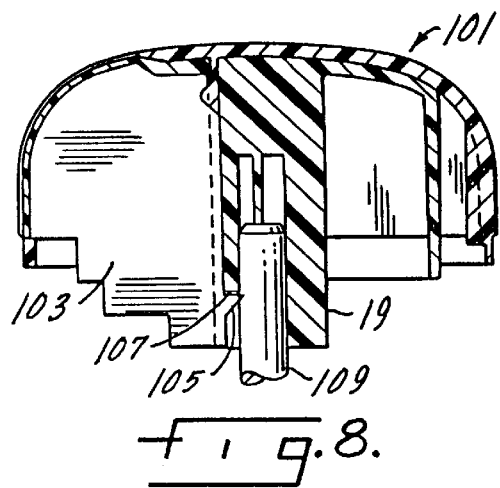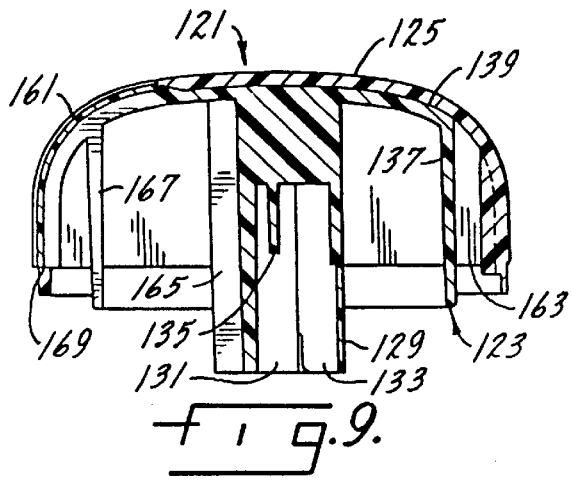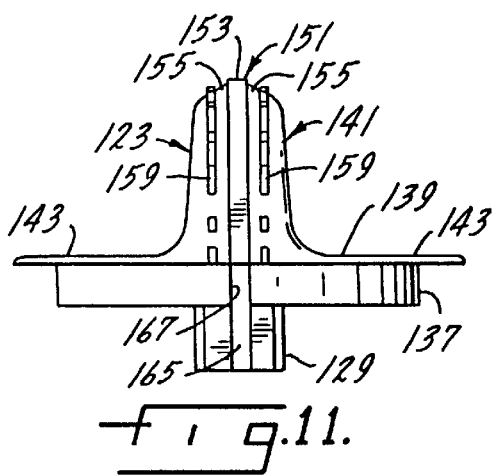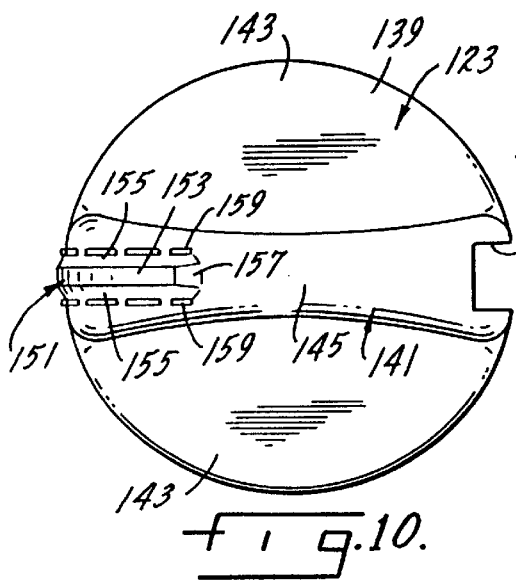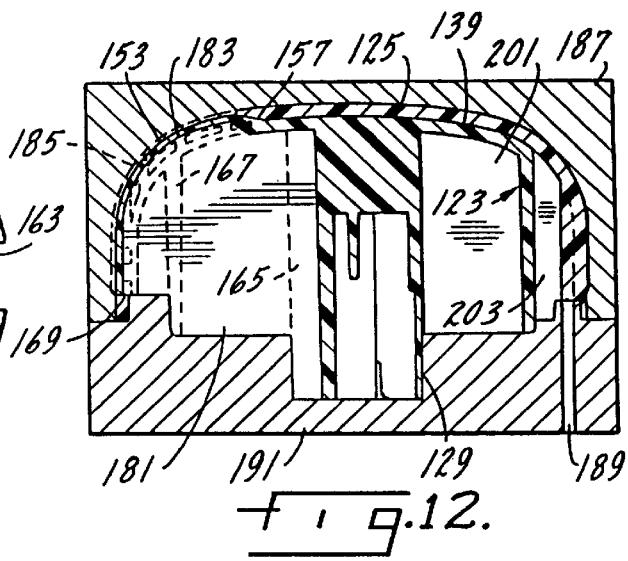

METHOD FOR MANUFACTURING AN INDICATOR KNOB AND A KNOB

BACKGROUND AND SUMMARY OF THE INVENTION

This invention is directed to a composite plastic article having a high clarity indicator, which may be back-lighted, and to a method of molding such a composite knob in a two shot molding process.

The composite plastic article of this invention and the method of making the composite plastic article will provide the following new and unobvious features:

- a knob having a high clarity indicator line located on one face of the knob and in which the high clarity of the indicator line is obtained in part by a sharp cutoff of the outer covering of the plastic surrounding and covering only the perimeter of an uncovered portion of the core in the shape of an indicator line;
- a sharp cutoff of the outer covering of the composite article around the uncovered portion of the core which is in the shape of an indicator line obtained in part through the use of a blocking tool;
- a composite plastic article having a high clarity indicator formed as part of a fin which projects outwardly of the core and in which the wall of the indicator is thinner than the wall of the core;
- a composite plastic article in which the outer covering is anchored to the core around the opening in the outer covering highlighting the indicator by protuberances in the core;
- a composite plastic article in which a relatively thin light transmitting window for a light pipe is positioned in the core;
- a composite plastic article in which a thin, light transmitting indicator window in the core is supported by a light pipe which functions as an anvil during the injection molding of the outer covering of the composite article;
- a composite plastic article having a permanently installed light pipe formed with a hook that may be engageable either radially inwardly or radially outwardly and may be formed to be flexible; and
- a method of making a composite plastic article in which the injection of the outer covering is directed through the tooling in a manner that prevents the core from being moved away from the mold cavity tooling.

Other objects of the invention may be found in the following specification, claims and drawings.

BRIEF DESCRIPTION OF THE DRAWINGS

The invention is illustrated more or less diagrammatically in the following drawings wherein:

FIG. 1 is a top plan view of one form of a composite knob embodying the novel aspects of the invention;

FIG. 2 is a bottom plan view of the knob of FIG. 1;

FIG. 3 is a side elevational view of the knob of FIG. 1;

FIG. 4 is a top plan view of the core of the composite knob of FIG. 1;

FIG. 5 is a bottom plan view of the core of FIG. 4;

FIG. 6 is a cross sectional view taken along line 6—6 of FIG. 1;

FIG. 7 is a cross sectional view of a modified composite knob embodying the novel aspects of this invention;

FIG. 8 is a cross sectional view of another modified composite knob embodying the novel aspects of this invention;

FIG. 9 is a cross sectional view of still another modified composite knob embodying the novel aspects of this invention;

FIG. 10 is a top plan view of the core of the composite knob of FIG. 9;

FIG. 11 is a side elevational view of the core of FIG. 10; and

FIG. 12 is a cross sectional view of mold tooling showing a method of manufacturing the composite knobs of this invention.

DESCRIPTION OF THE PREFERRED EMBODIMENTS

A plastic article in the form of a composite knob 11 embodying the novel features of one aspect of this invention is shown in FIGS. 1 to 6 of the drawings. It includes a core 13 and an outer covering 15. The core is conventionally molded of a white plastic such as an acetal which is translucent, at least in thin layers, while the outer covering, in order to provide contrast with the color of the core, is molded of a black nylon which is opaque in the thicknesses used. Other types and colors of plastic may be used in order to obtain a desirable contrast between the core 13 and the outer covering 15 of the composite knob 11 for reasons which will hereinafter be explained.

As is conventional, the core 13 includes a hub 19 having a socket 21. Gripping fingers 23 are formed in the socket. A shaft stop 25 is formed in the socket near the bottom thereof. An inner skirt 27 is formed as part of the core and extends rearwardly from the front wall 29 of the core. A hollow handle or blade portion 31 is formed integrally with the front wall of the core and extends diametrically across the front wall. The blade 31 divides the front wall of the core into oppositely located disk portions 33. The blade portion is topped with a crest portion 35.

A fin 41 is formed in the crest portion 35 of the blade 31. The fin includes a curved rectangular web 43 which is supported by inclined side walls 45 and an inclined end wall 47 as is most clearly shown in FIG. 4. The curved web 43 is referred to as a window because in knobs that are to be back-lighted, the core 13 is formed of a plastic that is translucent, at least in thin layers, and the web is formed having a thickness less than that of the front wall 29 of the core and sufficiently thin to allow the passage of sufficient light to be translucent. A small rectangular passage 51 is formed in the crest portion 35 of the blade at a position radially inwardly from the arcuate rectangular window 43. When the opaque plastic of the outer covering hardens around the perimeter of the window 43, the window will function as an indicator 81. In situations wherein the knob is not to be backlighted, it is not necessary that the core 13 be molded of a translucent material. Further, the web 43 need not be thinner than the wall 29 of the core when it is not transmitting light.

An outwardly opening channel 53 is formed in the crest portion 35 of the blade 31 on the opposite diametric side of the blade relative to the web 43. This channel extends through the disk portions 33 of the front wall 29 of the core. A slot 55 is formed in the hub, an aligned slot 57 is formed in the inner skirt and another aligned slot 59 is formed in the crest portion 35 of the blade to receive an anvil. An anvil 71 formed of a flat, irregularly shaped piece of plastic such as polycarbonate fits in the slots 55, 57 and 59 to position an arcuate edge 73 of the anvil against the underside of the window 43 of the fin 41 in the manner shown in FIG. 6. A notch 75 is formed in the anvil radially inwardly of its arcuate edge 73. The axially inwardly located edge 77 of the anvil may be stepped for clearance purposes.

The anvil 71 is positioned in its slots 55, 57 and 59 with its arcuate portion 73 engaging the underside of the window 43 of the fin 41 to support the window during injection molding of the outer covering 15 in a second shot of a molding process. It should be understood and appreciated that the term "two shot" molding process as used in this specification refers to any suitable multi-step molding process whether the steps of the process are performed separately or sequentially. Preferably, the material of the outer covering 15 is injected into a mold, in which the core 13 has been positioned, through the channel 53 formed in the core 13. During this step of the molding process, tooling of the type shown in FIG. 12 will be engaging the outer surface of the window 43 to prevent the plastic material which forms the outer covering of the knob from flowing over and concealing the window which forms the backlighted indicator 81. The tooling has an end surface which is the same shape, but slightly smaller than the window 43. This smaller "footprint" of the tooling provides a border 82 of the material of the outer covering 15 which flows over the edges of the window 43 to tightly encapsulate the window 43 while still sharply delineating the indicator 81. As the material of the outer covering 15 flows through the channel 53 to the outer face of the front wall 29 and blade portion 31 of the core 13, a small amount of the material of the outer covering will flow through the passage 51 and into the notch 75 of the anvil 71 as shown in FIG. 6 of the drawings to permanently lock the anvil in position. The plastic material which forms the outer covering 15 of the knob will also form a peripheral skirt 83 on the outer covering.

The relatively thin nature of the window portion 43 of the fin 41 will readily transmit light from the anvil 71 to illuminate the backlighted indicator 81. Thus, the anvil not only supports the window portion 43 of the fin 41 during the second shot of the molding process but also because of the light transmitting characteristics of the plastic of which it is made functions as a light pipe for illumination of the window 43 of the indicator 81.

A modified embodiment of the invention is shown in FIG. 7 of the drawings. The knob 91 is similar to knob 11 of the previous embodiment in all features except as to those which are hereinafter pointed out as modified. In this modified embodiment, the anvil 71 is replaced by an anvil 93 which is also formed of a light transmitting plastic such as a polycarbonate. The anvil 93 is formed with a radially outwardly engaging hook 95. The hook is made more flexible by the provision of a longitudinally extending notch 97 located radially inwardly of the hook. The hook may engage a secondary plate or a bezel to secure the knob relative to a shaft. It should be noted that the anvil extends longitudinally beyond the hub 19 of the core 13 to enable its hook to engage a suitable restraining element.

Another modified embodiment of the invention is shown in FIG. 8 of the drawings. The knob 101 shown in this embodiment is similar in all pertinent aspects to knob 11 of the first described embodiment except as to those aspects which are hereinafter specifically referred to as modified. In knob 101, an anvil 103 is also formed of a light transmitting plastic such as a polycarbonate. The anvil 103 is formed with a radially inwardly engageable hook 105 which extends through a notch 107 in the hub 19 of the core where it will contact the shaft 109. The hook will embed itself in the shaft if the shaft is made of a softer material than that of the anvil. If the shaft is made of a material which is harder than that of the anvil, such as a metal, then a groove or slot must be formed in the shaft to receive the hook 105, but this groove or slot is not shown in the drawings.

Still another embodiment of the invention is shown in the drawings of FIGS. 9, 10, 11 and 12. Therein, a composite plastic article in the form of a knob 121 includes a core 123 and an outer covering 125. The core is conventionally molded of a white plastic in order to provide contrast with the outer covering which is molded of a black plastic in the second step of a two shot molding process which is shown in FIG. 12. Other combinations of types and colors of plastic may be used in order to obtain a desirable contrast between the core 123 and the outer covering 125 of the composite knob 121 for reasons which will hereinafter be explained.

The core 123 includes a hub 129 having a socket 131. The socket may have gripping fingers 133. A shaft stop 135 is formed in the socket near the bottom thereof. An inner skirt 137 is formed as part of the core and extends rearwardly from the front wall 139 of the core. A hollow handle or blade portion 141 is formed integrally with the front wall of the core and extends diametrically across the front wall. The blade 141 divides the front wall of the core into oppositely located disk portions 143. The blade portion is topped with a crest portion 145.

A fin 151 is formed in the crest portion 145 of the blade 141. The fin includes a curved rectangular web 153 which is supported by inclined side walls 155 and an inclined end wall 157 as is most clearly shown in FIGS. 10 and 11 of the drawings. A row of protuberances 159 are formed in the front wall 139 of the core in the blade portion 141 on opposite sides of the fin 151. The protuberances extend substantially the entire length of the web 153. When the color contrasting plastic of the outer covering 125 hardens around the perimeter of the web 153, the protuberances help to anchor the outer covering of plastic to the core and prevent the outer covering from pulling away from the perimeter of the web thus helping to form a high clarity indicator 161.

An outwardly opening channel 163 is formed in the crest portion 145 of the blade 141 on the opposite diametric side of the blade relative to the web 153. This channel extends through the disk portions 143 of the front wall 139 of the hub 129 and connects to the gate which supplies the plastic for the outer covering 125.

A slot 165 is formed in the hub 129, an aligned slot 167 is formed in the inner skirt 137 and another aligned slot 169 is formed in the crest portion 145 to receive an anvil which supports the web 153 during the second shot injection of the outer covering 125. In this embodiment of the invention, the anvil 181 is formed as part of the tooling which is inserted into the slots 165, 167 and 169 in the core 123 as shown in FIG. 12 of the drawings. The anvil has an arcuate edge 183 which engages and supports the underside of the web 153 and is withdrawn after hardening of the outer covering 125. A separate anvil, such as the anvil 71, may now be inserted into the slots 165, 167 and 169 of the core 123 and secured by flowing the material of the outer covering 125 under an edge of the anvil as shown at 180 in FIG. 7 to enable the anvil to function as a light pipe.

Also during the injection of the plastic of the outer covering 125, a blocking tool 185 formed as part of the mold cavity tooling 187 engages the outer surface of the web 153 to prevent the plastic material which forms the outer covering 125 of the knob from flowing over and concealing the web 153. The blocking tool 185 has an end surface which is the same shape, but slightly smaller than the web 153. This smaller "footprint" of the tooling provides a border, similar to border 82 previously described, of the material of the outer covering 125 which flows over the edges of the web 153 to tightly seal the web 153 while still sharply delineating the indicator 161. After hardening of the outer covering, the removal of the blocking tool 185 leaves an opening through which the web 153 is visible to function as a high clarity indicator 161.

The molten plastic forming the outer covering 125 of the composite knob 121 is injected into the mold tooling through a sprue 189 formed in the mold core 191. The sprue aligns with the channel 163 of the core 123 to carry the molten plastic to the outer face of the front wall 139 of the core. The anvil 181 may be formed integrally with the mold core 191 or may be formed separately and attached to the mold core 191.

In another aspect of this invention, the anvil 181 is formed with additional segments 201 and 203 which may be formed integrally with the mold core 191 or may be formed separately and attached to the mold core 191. These anvil segments support the core 123 to prevent it from being moved away from the mold cavity tooling 187 when molten plastic which forms the outer covering 125 is injected through the sprue 189 into the mold tooling. Specifically, the anvil segment 203 assists in directing the molten plastic of the outer covering to the mold cavity adjacent the outer face of the front wall 139 of the core.

I claim:

1. A composite knob including:
   a plastic core having a front wall of generally uniform thickness,
   a translucent window portion formed integrally with said core and having a thickness less than said generally uniform thickness of said front wall, and
   a light transmitting plastic anvil positioned in said core in engagement with said window portion.

2. A composite knob, including:
   A plastic core,
   said core having a front wall of generally uniform thickness,
   an integral window portion formed in said front wall,
   said integral window portion having a thickness no greater than said uniform thickness of said front wall, and
   an outer covering of plastic overlying said front wall of said core except for at least a substantial center area of said window portion.

3. The composite knob of claim 2 in which said integral window portion is located in a projected relation to said front wall.

4. The composite knob of claim 3 in which said integral window portion projects outwardly of said front wall.

5. The composite knob of claim 2 in which a plastic anvil is positioned in said core in engagement with said window portion.

6. The composite article of claim 5 in which said window portion is translucent.

7. The composite knob of claim 6 in which said anvil is formed of a light transmitting plastic.

8. A composite knob, including:
   a plastic core,
   said core having a front wall of generally uniform thickness,
   an integral window portion formed in said front wall,
   an outer covering of plastic overlying said front wall of said core except for at least a substantial center area of said window portion thereof, and
   protrusions formed in said front wall of said core adjacent said window portion to anchor said outer covering of plastic to said core and to prevent said outer covering from moving away from said window portion.

9. The composite knob of claim 8 in which said window portion is thinner than said front wall.

10. The composite knob of claim 9 in which a plastic anvil is positioned in said core in supporting engagement with said window portion.

11. The composite knob of claim 10 in which said core is formed of a translucent plastic.

12. The composite knob of claim 11 in which said anvil is formed of a light transmitting plastic.

13. The composite knob of claim 11 in which said outer covering is formed of an opaque plastic.

14. The composite knob of claim 10 including a longitudinally extending hub formed as part of said core and slots formed in said hub and said front wall to receive and position said anvil.

15. The composite knob of claim 10 in which said outer covering of plastic extends through said front wall of said core and interlocks said core and said anvil.

16. The composite knob of claim 10 in which a blade is formed as a portion of said front wall, said window portion is formed as a part of said blade and said anvil is positioned in said blade.

17. The composite knob of claim 10 in which said anvil is formed of a planar material.

18. The composite knob of claim 10 in which a radially engaging hook is formed on said plastic anvil.

19. The composite knob of claim 18 in which said hook is radially outwardly engaging.

20. The composite knob of claim 18 in which said hook is radially inwardly engaging.

21. The composite knob of claim 18 in which said hook is resilient.

* * * * *